United States Patent
Goto (10) Patent No.: US 7,599,117 B2
(45) Date of Patent: Oct. 6, 2009

(54) VIEW ANGLE CONTROL SHEET AND DISPLAY DEVICE

(75) Inventor: Masahiro Goto, Tokyo-to (JP)

(73) Assignee: DAI Nippon Printing Co., Ltd., Tokyo-to (JP)

(*) Notice: Subject to any disclaimer, the term of this patent is extended or adjusted under 35 U.S.C. 154(b) by 454 days.

(21) Appl. No.: 10/587,551

(22) PCT Filed: Sep. 14, 2005

(86) PCT No.: PCT/JP2005/016928

§ 371 (c)(1),
(2), (4) Date: Jul. 27, 2006

(87) PCT Pub. No.: WO2006/030823

PCT Pub. Date: Mar. 23, 2006

(65) Prior Publication Data

US 2007/0153377 A1 Jul. 5, 2007

(30) Foreign Application Priority Data

Sep. 15, 2004 (JP) ............................ 2004-268826
May 9, 2005 (JP) ............................ 2005-135736

(51) Int. Cl.
*G03B 21/60* (2006.01)

(52) U.S. Cl. ..................................... 359/453; 359/460
(58) Field of Classification Search ......... 359/452–453, 359/460, 455–456

See application file for complete search history.

(56) References Cited

U.S. PATENT DOCUMENTS 5,768,014 A * 6/1998 Lee ............................ 359/457
6,417,966 B1 * 7/2002 Moshrefzadeh et al. ..... 359/453
6,636,355 B2 * 10/2003 Moshrefzadeh et al. ..... 359/460
6,822,792 B2 * 11/2004 Goto .......................... 359/456

FOREIGN PATENT DOCUMENTS

| JP | 58-47681    | 10/1983 |
| JP | 6-504627    | 5/1994  |
| JP | 9-311206    | 12/1997 |
| JP | 2003-50307  | 2/2003  |
| JP | 2003-57416  | 2/2003  |
| JP | 2003-066206 | 3/2003  |
| JP | 2005-181691 | 7/2005  |

* cited by examiner

*Primary Examiner*—Christopher Mahoney
(74) *Attorney, Agent, or Firm*—Ladas & Parry LLP (57) ABSTRACT

A view angle control sheet having a wide view angle, in which diffuse light from a screen image source is effectively utilized to suppress a decrease in screen brightness while a decrease in image contrast caused by an outside light beam is suppressed to prevent generation of a ghost to improve contrast. The lens portions have trapezoidal shapes in section arranged at predetermined intervals. A wedge-shaped portion between the lens portions has a bottom surface on a screen image source side while having a leading end on an observer side, and the following relationships hold: $Nx \pounds Ny$ and $-0.01 < Dn - \cos q < 0.002$, where Nx is a refractive index of a material constituting at least a slope portion of the wedge-shaped portion, Ny is a refractive index of a material constituting the lens portion, and Dn is a ratio (Nx/Ny).

26 Claims, 10 Drawing Sheets

(SCREEN IMAGE SOURCE SIDE)　　　　　　　　(OBSERVER SIDE)

VIEW ANGLE CONTROL SHEET AND DISPLAY DEVICE

TECHNICAL FIELD

The present invention relates to a view angle control sheet and a display device in which the view angle control sheet is used. The view angle control sheet is placed in front of a display, and the view angle control sheet has a function of preventing a performance decrease of the display, particularly the performance decrease caused by a contrast decrease and the like when an outside light beam impinges on the display, and a function of preferably diffusing effective light of the display to broaden a view angle.

BACKGROUND ART

In an organic light emitting device (hereinafter, referred to as an "OLED") display, a liquid crystal display (hereinafter, referred to as a "LCD"), and the like, usually it is preferable that the display have a wide view angle such that a good image can be obtained when an observer sees the image from any position.

Figure 10:
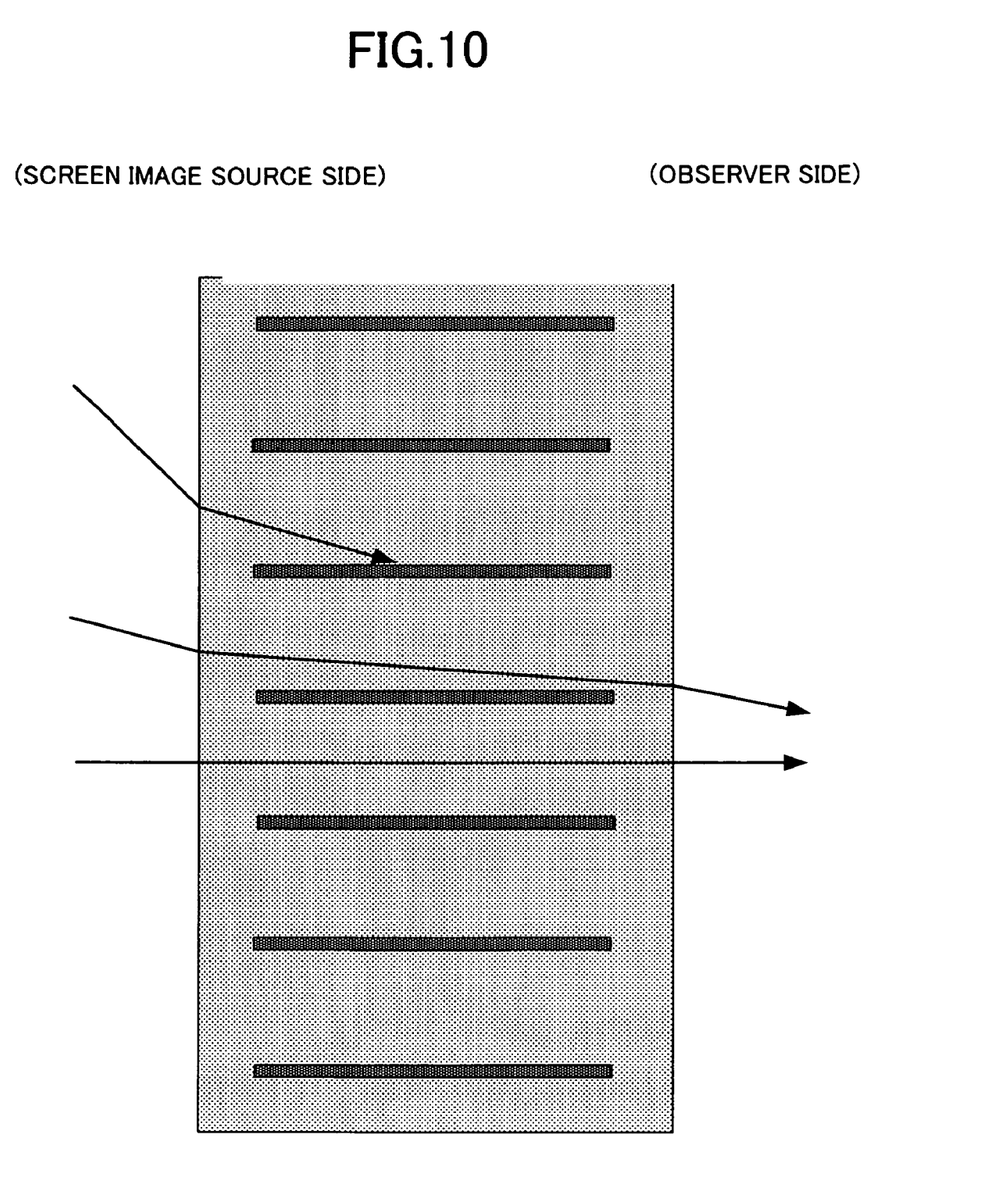
FIG. 10 is a view showing an example of the conventional view angle control sheet.

On the other hand, for example, in the case where a person performs work in a commuter train, sometimes the person needs to prevent other people from taking a look at the inside of a screen. In such cases, it is desirable that the view angle be controlled such that the screen can be seen only from the observer of the display while the screen cannot be seen from other people. In order to meet such the demand, for example, a louver type view angle control sheet is developed and used as shown in FIG. 10. The louver type view angle control sheet exerts an effect that an outside light beam is blocked to enhance contrast. For example, there is disclosed a view angle control sheet in which generation of a double image (referred to as ghost) is decreased in the louver (see Patent Document 1 to Patent document 3). FIG. 5 of Patent Document 1 is an explanatory view of the ghost.

Patent Document 1: Japanese Patent Application Publication (JP-B) No. 58-47681

Patent Document 2: Japanese Patent Application National Publication No. 6-504627

Patent Document 3: Japanese Patent Application Laid-Open No. 9-311206

DISCLOSURE OF THE INVENTION

Problem to be Solved by the Invention

However, in the conventional louver type view angle control sheets disclosed in Patent Document 1 to Patent Document 3, screen image light in an oblique direction is simply blocked. Therefore, in a display device such as a high-resolution LCD, there is a problem that the screen image source side diffuse light of a diffuse light source is decreased to reduce brightness of the screen.

Therefore, an object of the invention is to provide a view angle control sheet having a wide view angle, in which the diffuse light from the screen image source is effectively utilized to suppress the decrease in screen brightness while the decrease in image contrast caused by the outside light beam is suppressed to prevent the generation of the ghost and thereby improve the contrast.

Means for Solving the Problem
The invention will be described below.

The invention according to claim 1 is a view angle control sheet characterized in that lens portions having trapezoidal shapes in section are arranged at predetermined intervals, a wedge-shaped portion between the lens portions adjacent to each other is filled with the same material as the lens portion or with a material different from the lens portion, the wedge-shaped portion has a bottom surface on a screen image source side while having a leading end on an observer side, and the following relationships hold: $Nx \leq Ny$ and $-0.01 < \Delta n - \cos \theta < 0.002$, where Nx is a refractive index of a material constituting at least a slope portion of the wedge-shaped portion, Ny is a refractive index of a material constituting the lens portion, and $\Delta n$ is a ratio ($Nx/Ny$) of the refractive index Nx to the refractive index Ny, and a sectional shape of the wedge-shape portion has a wide bottom surface on the screen image source side.

In a view angle control sheet according to claim 1, the invention according to claim 2 is characterized in that, assuming that an angle formed by the slope portion of the wedge-shaped portion and a normal line of a light beam outgoing plane is set at $\theta$, $\theta$ ranges from 3 degrees to 15 degrees. That is, in the invention, the brightness improvement effect is not obtained because the diffuse light does not reach an observer-side front face when $\theta$ is lower than 3 degrees, while the ghost is generated when $\theta$ exceeds 15 degrees. In order to maintain the front face brightness with the view angle control sheet, $\theta$ preferably ranges from 3 degrees to 15 degrees.

In a view angle control sheet according to claims 1 or 2, the invention according to claim 3 is characterized in that a sectional shape of the wedge-shaped portion is substantially an isosceles triangle.

In a view angle control sheet according to any one of claims 1 to 3, the invention according to claim 4 is characterized in that the slope portion has a curved sectional shape and/or a polygonal-line sectional shape such that the screen image source side differs from the observer side in an angle formed by the slope portion and an observer-side surface.

In a view angle control sheet according to any one of claims 1 to 4, the invention according to claim 5 is characterized in that the wedge-shaped portion has a light-absorbing effect.

In a view angle control sheet according to claim 5, the invention according to claim 6 is characterized in that the wedge-shaped portion is filled with a material to which light-absorbing particles are added.

In a view angle control sheet according to claim 6, the invention according to claim 7 is characterized in that the wedge-shaped portion is formed in a wedge shape having a wide bottom surface on the screen image source side, and an average particle size of the light beam absorption particles is μm or larger.

In a view angle control sheet according to claims 6 or 7, the invention according to claim 8 is characterized in that an addition amount of light-absorbing particles ranges from 10 to 50 volume % in the material with which the wedge-shape portion is filled.

The invention according to claim 9 is one in which the above problem is solved by a display device characterized in that one view angle control sheet according to any one of claims 1 to 8 is laminated on the observer side of a screen image source or two view angle control sheets according to any one of claims 1 to 8 are laminated on the observer side of the screen image source while being substantially orthogonal to each other.

In a view angle control sheet according to any one of claims 1 to 9, the invention according to claim 10 is characterized in that a function of any one of AR, AS, AG, and a touch sensor or a plurality of functions thereof are imparted to at least one surface side.

The invention according to claim 11 is one in which the above problem is solved by a display device characterized in that a view angle control sheet according to any one of claims 1 to 10 is bonded.

Effect of the Invention

According to the invention, the lens portions having the trapezoid in section are arranged at predetermined intervals, and the wide bottom surface is formed on the screen image source side while the leading end portion is formed in the round shape in the wedge-shaped sectional shape between the adjacent lens portions, i.e., the curved shape protruded toward the leading end side is imparted to the wedge-shaped leading end portion. Therefore, the wedge-shaped portion is easily produced, and the high-quality view angle control sheet in which strength of the wedge-shaped portion is improved can be obtained. According to the view angle control sheet of the invention, the decrease in image contrast caused by the outside light beam can be suppressed to prevent the generation of the ghost. According to the view angle control sheet of the invention, the decrease in screen brightness is suppressed by effectively utilizing the diffuse light from the screen image source, and the view angle control sheet having the wide view angle can be obtained.

Best Mode for Carrying Out the Invention

Preferred embodiments of the invention will be described below with reference to the drawings.

FIRST EMBODIMENT

Figure 1:
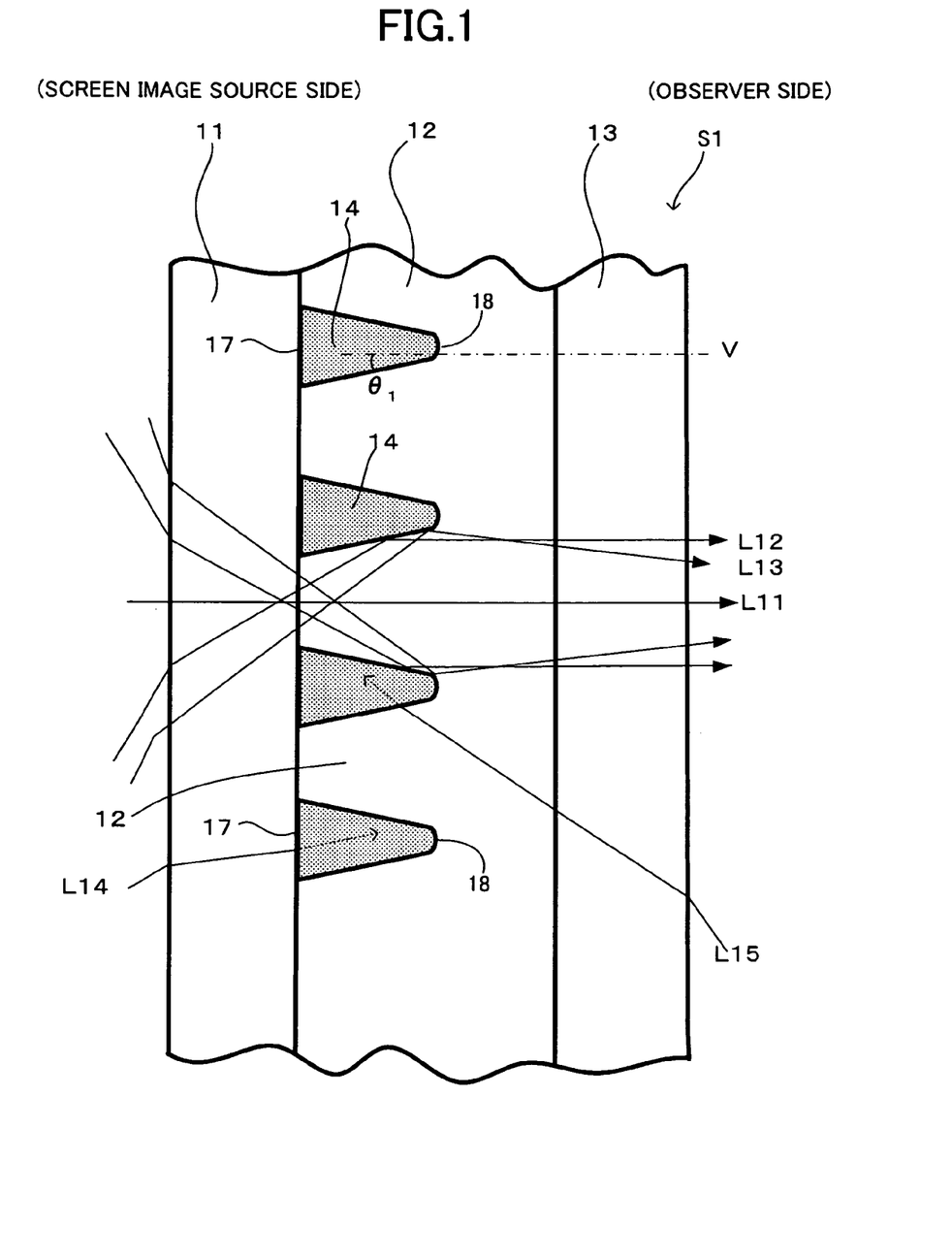
FIG. 1 is a view showing a cross section in one direction of a view angle control sheet according to a first embodiment of the invention.

FIG. 1 is a view showing a cross section in one direction of a view angle control sheet S1 according to a first embodiment of the invention. In FIG. 1, a screen image light source, which emits diffuse light, is arranged on the left side in the drawing, and an observer lies on the right side in the drawing. The view angle control sheet S1 is formed by laminating a screen image source side base sheet 11, a lens portion 12, and an observer-side base sheet 13 in the order from the screen image source side to the observer side. The lens portion 12 is made of a substance whose refractive index is Ny1. In FIG. 1, a sectional shape of a portion sandwiched by hypotenuses of the lens portions 12 and 12 vertically adjacent to each other has a wedge shape which includes a bottom surface 17 and a top portion 18. The wide bottom surface 17 is formed on the screen image source side. The top portion 18 is formed on the observer side, and the top portion 18 is formed in a convex curved surface having a width toward the observer side. The portion formed in the wedge shape is filled with a substance having the refractive index Nx1 lower than the refractive index Ny1 of the lens portion 12. Hereinafter, the portion formed in the wedge shape is referred to as "wedge-shaped portion 14". The wedge-shaped portion 14 has the top portion 18 whose width is narrowed on the observer side, and the wedge-shaped portion 14 also has the bottom surface 17 on the screen image source side.

A ratio of the refractive index Ny1 of the lens portion 12 to the refractive index Nx1 of the wedge-shaped portion 14 is set in a predetermined range in order to obtain optical characteristics of the view angle control sheet S1. An angle formed by the slope where the wedge-shaped portion 14 and the lens portion 12 are in contact with each other and a normal line V (line parallel to a normal-incidence light beam with respect to the view angle control sheet S1) of an outgoing light beam plane is formed at a predetermined angle $\theta_1$.

The wedge-shaped portion 14 is colored in predetermined density with pigment such as carbon or with predetermined dye. The screen image source side base sheet 11 and the observer-side base sheet 13 are made of a material whose refractive index is substantially similar to that of the lens portion 12. An outside surface of the observer-side base sheet 13 has a function of at least one of AR, AS, and AG on the observer side. "AR" is abbreviation of anti-reflection, and the "AR" shall mean the function of suppressing reflectance of the light beam incident to the lens surface. "AS" is the abbreviation of anti-static, and the "AS" shall mean the antistatic function. "AG" is the abbreviation of anti-glare, and the "AG" shall mean the anti-glaring function of the lens. The view angle control sheet S1 according to the first embodiment may have only one of these functions, or the view angle control sheet S1 may have the plural functions thereof.

An optical path of the light beam incident to the lens portion 12 of the view angle control sheet S1 will briefly be described with reference to FIG. 1. The optical paths of the light beams L11 to L15 are schematically shown in FIG. 1. The normal light beam L11 incident near a center portion of the lens portion 12 from the screen image light source side goes straight in and passes through the view angle control sheet Si to reach the observer. The light beam L12 incident near an end portion of the lens portion 12 from the screen image light source side with a predetermined angle is totally reflected from the slope due to a refractive index difference between the refractive index Ny1 of the lens portion 12 and the refractive index Nx1 of the wedge-shaped portion 14, and the light beam L12 is output onto the observer side as the normal light beam. The light beam L13 incident near the end portion of the lens portion 12 from the screen image light source side with the large angle is totally reflected from the slope, and the light beam L13 is output onto the observer side with the small angle close to the normal light beam while output toward the direction opposite from the direction of the incident light beam in relation to the normal line. The light beam L14, which directly impinges on the wedge-shaped portion 14 from the bottom surface 17, is incident to the inside of the wedge-shaped portion 14. Since the wedge-shaped portion 14 is colored and the light beam L14 is absorbed by the wedge-shaped portion 14, and thus the light beam L14 never reaches the observer side. The outside light beam L15 incident to the slope from the observer side with the angle smaller than the predetermined angle is not totally reflected irrespective of the refractive index difference between the lens portion 12 and the wedge-shaped portion 14, but the outside light beam L15 is incident to the inside of the wedge-shaped portion 14 and then the outside light beam L15 is absorbed by the colored wedge-shaped portion 14. Accordingly, the image contrast is improved in a visual field from the observer side. Thus, the view angle can be controlled in the cross-sectional direction and the decrease in brightness can be suppressed, so that the high-contrast view angle control sheet S1 can be obtained.

SECOND EMBODIMENT

Figure 2:
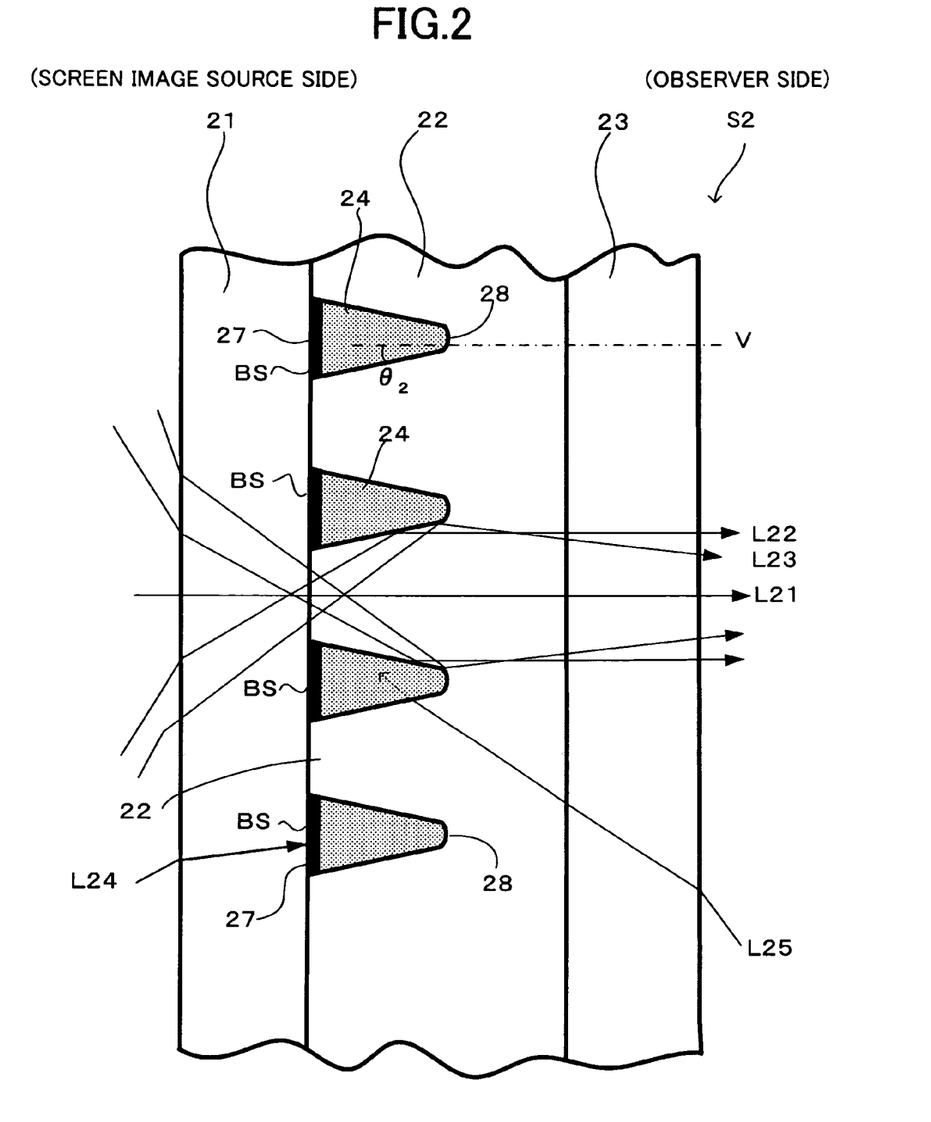
FIG. 2 is a view showing a cross section in one direction of a view angle control sheet according to a second embodiment.

FIG. 2 is a view showing a cross section in one direction of a view angle control sheet S2 according to a second embodiment. In FIG. 2, similarly the screen image light source is arranged on the left side in the drawing and the observer lies on the right side in the drawing. The view angle control sheet S2 is formed by laminating a screen image source side base sheet 21, a lens portion 22, and an observer-side base sheet 23 in the order from the screen image source side to the observer side. The lens portion 22 is made of a substance whose refractive index is Ny2. In FIG. 2, the sectional shape of a portion sandwiched by the slopes of the lens portions 22 and 22 vertically adjacent to each other has the wedge shape which includes a bottom surface 27 and a top portion 28. The wide bottom surface 27 is formed on the screen image source side. The top portion 28 is formed on the observer side, and the top portion 28 is formed in a convex curved surface having a width toward the observer side. The portion formed in the wedge shape is filled with a substance having the refractive index Nx2 lower than the refractive index Ny2 of the lens portion 22. Hereinafter, the portion formed in the wedge shape is referred to as "wedge-shaped portion 24". The wedge-shaped portion 24 has the top portion 28 on the observer side, and the wedge-shaped portion 24 also has the wide bottom surface 27 on the screen image source side.

A ratio of the refractive index Ny2 of the lens portion 22 to the refractive index Nx2 of the wedge-shaped portion 24 is set in a predetermined range in order to obtain the optical characteristics of the view angle control sheet S2. An angle formed by the slope where the wedge-shaped portion 24 and the lens portion 22 are in contact with each other and the normal line V (line parallel to the normal-incidence light beam relative to the view angle control sheet S2) of the outgoing light beam plane is formed at a predetermined angle $\theta_2$.

The wedge-shaped portion 24 is colored in the predetermined density with the pigment such as carbon or with the predetermined dye. The screen image source side base sheet 21 and the observer-side base sheet 23 are made of the material whose refractive index is substantially similar to that of the lens portion 22. The outside surface of the observer-side base sheet 23 has the function of at least one of AR, AS, AG and touch sencor on the observer side. In the second embodiment, the view angle control sheet S2 may have only one of these functions, or the view angle control sheet S2 may have the plural functions thereof.

In the view angle control sheet S2 shown in FIG. 2, a black stripes BS are formed in the bottom surface 27. The inside of the wedge-shaped portion 24 is filled with a material having the refractive index Nx2 lower than the refractive index Ny2 of the lens portion 22. In the view angle control sheet S2 having the above-described configuration, light beams L21 to L23 incident from the screen image light source side pass through the same optical paths as the incident light beams L11 to L13 in the view angle control sheet S1 according to the first embodiment. A light beam L24 incident to the black stripe BS of the bottom surface 27 is absorbed by the black stripe BS. An outside light beam L25 incident to the slope from the observer side with the angle smaller than the predetermined angle is not totally reflected irrespective of the refractive index difference between the lens portion 22 and the wedge-shaped portion 24, but the outside light beam L25 is incident to the inside of the wedge-shaped portion 24. The outside light beam L25 is absorbed by the colored wedge-shaped portion 24. Thus, the image contrast is improved in the visual field from the observer side. Accordingly, the view angle control sheet S2 can obtain the same effect as the view angle control sheet S1 according to the first embodiment. That is, the view angle can be controlled in the cross-sectional direction and the decrease in brightness can be suppressed, so that the high-contrast view angle control sheet S2 can be obtained.

THIRD EMBODIMENT

Figure 3:
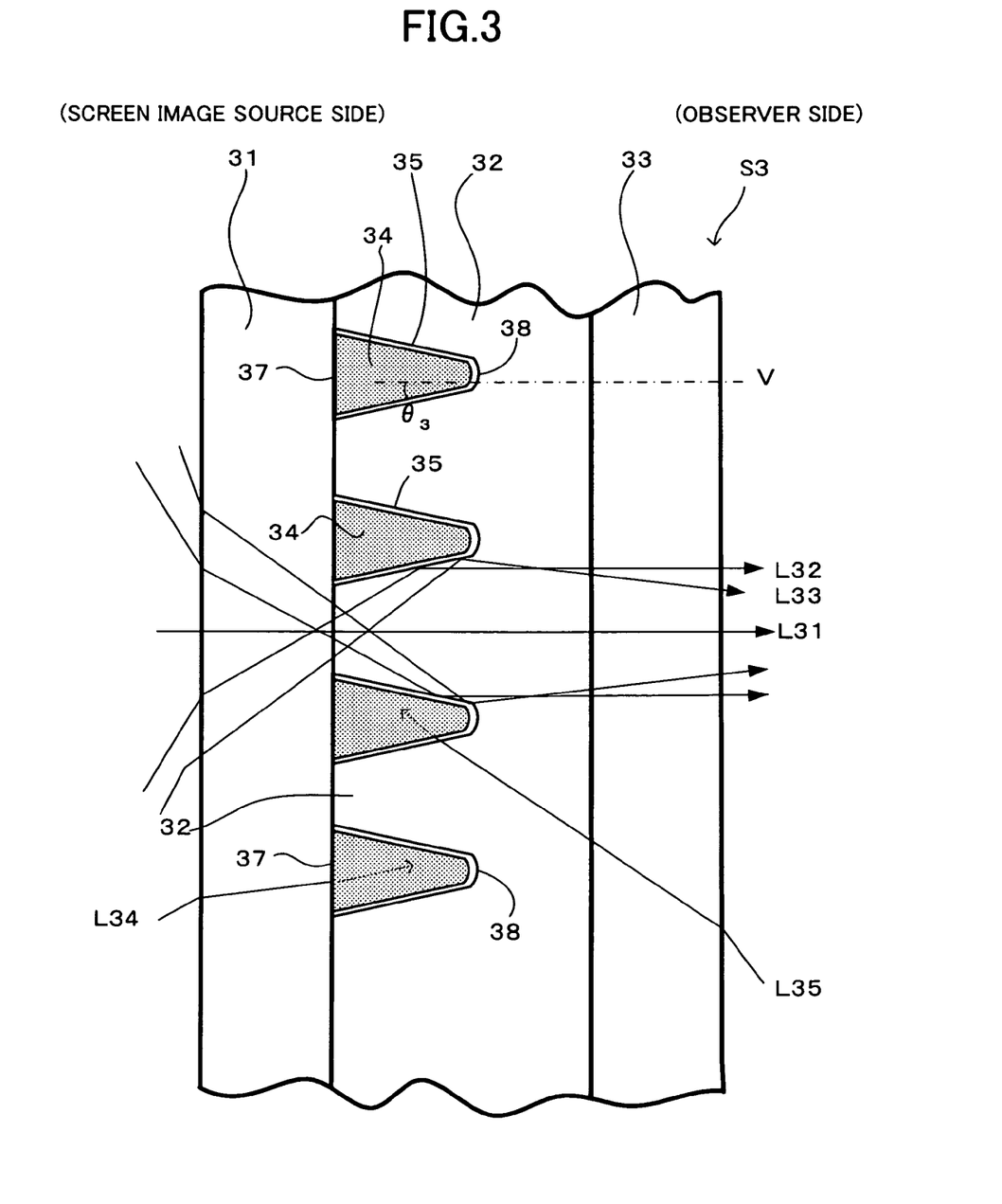
FIG. 3 is a view showing a cross-section in one direction of a view angle control sheet according to a third embodiment.

FIG. 3 shows a view angle control sheet S3 according to a third embodiment of the invention. The view angle control sheet S3 is formed by laminating a screen image source side base sheet 31, a lens portion 32, and an observer-side base sheet 33 in order from the screen image source side to the observer side. The lens portion 32 is made of a substance whose refractive index is Ny3. The inside of a wedge-shaped portion 34 having the wedge shape in section is filled with a substance having the substantially same refractive index as the refractive index Ny3. The wedge-shaped portion 34 is sandwiched between the lens portions 32 and 32 vertically adjacent to each other. In FIG. 3, the slopes and a top portion 38 of the wedge-shaped portion 34 are formed by a layer 35 (hereinafter, referred to as "transparent low-refractive index layer 35"). The transparent low-refractive index layer 35 is made of a transparent material having a refractive index Nx3 smaller than the refractive index Ny3.

A ratio of the refractive index Ny3 of the lens portion 32 to the refractive index Nx3 of transparent low-refractive index layer 35 is set in a predetermined range in order to obtain the optical characteristics of the view angle control sheet S3. An angle formed by the slope where the transparent low-refractive index layer 35 and the lens portion 32 are in contact with each other and the normal line V (line parallel to the normal-incidence light beam relative to the view angle control sheet S3) of the outgoing light beam plane is formed at a predetermined angle $\theta_3$.

The lens portion 32 is usually made of a material such as epoxy acrylate having an ionizing radiation curing property. The transparent low-refractive index layer 35 is made of a material having the refractive index Nx3 lower than the refractive index Ny3 of the lens portion 32. The wedge-shaped portion 34 is colored in predetermined density with the pigment such as carbon, colorant or with the predetermined dye. The screen image source side base sheet 31 and the observer-side base sheet 33 are made of a material whose refractive index is substantially similar to that of the lens portion 32. Similarly to the view angle control sheet S1 according to the first embodiment, the outside surface of the observer-side base sheet 33 has the function of at least one of AR, AS, AG and touch censor on the observer side.

In the view angle control sheet S3 having the above-described configuration, light beams L31 to L33 incident from the screen image light source side pass through the same optical paths as the incident light beams L11 to L13 in the view angle control sheet S1 according to the first embodiment. A light beam L34 which impinges on a bottom surface 37 of the colored wedge-shaped portion 34 is incident to the inside of the colored wedge-shaped portion 34, the light beam L34 is absorbed, and the light beam L34 never reaches the observer side. An outside light beam L35 incident to the slope from the observer side with the angle smaller than a predetermined angle is not totally reflected irrespective of the refractive index difference between the lens portion 32 and the transparent low-refractive index layer 35, but the outside light beam L35 is incident to the inside of the wedge-shaped portion 34. Then, the outside light beam L35 is absorbed by the colored wedge-shaped portion 34. Thus, the image contrast is improved in the visual field from the observer side. Accordingly, the view angle control sheet S3 can obtain the same effect as the view angle control sheet S1 according to the first embodiment. That is, the view angle can be controlled in the cross-sectional direction and the decrease in brightness can be suppressed, so that the high-contrast view angle control sheet S3 can be obtained.

FOURTH EMBODIMENT

Figure 4:
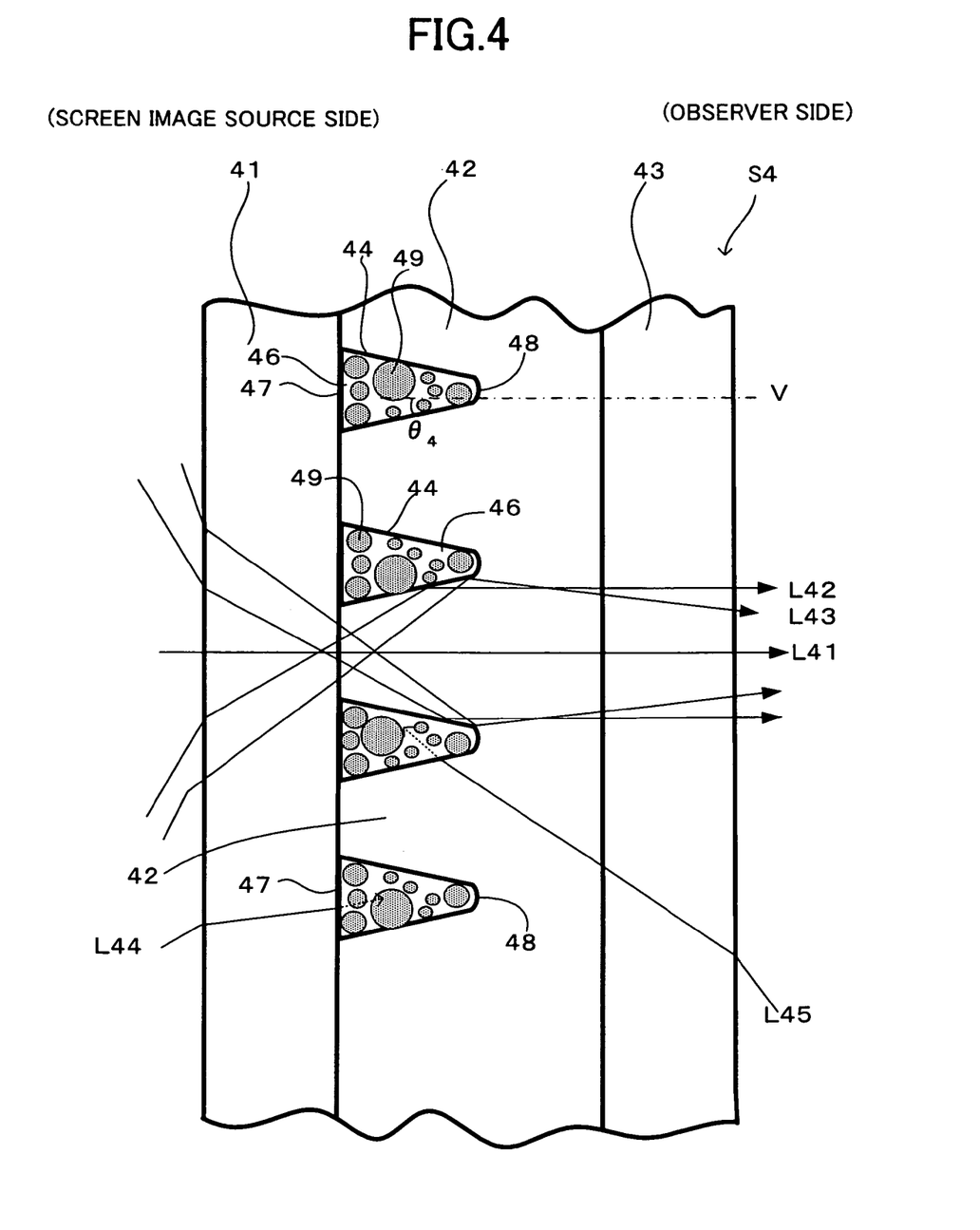
FIG. 4 is a view showing a cross section in one direction of a view angle control sheet according to a fourth embodiment.

FIG. 4 shows a cross section of a view angle control sheet S4 according to a fourth embodiment of the invention. The view angle control sheet S4 is formed by laminating a screen image source side base sheet 41, a lens portion 42, and an observer-side base sheet 43 in the order from the screen image source side to the observer side. The lens portion 42 is made of a substance having a refractive index Ny4. In FIG. 4, a portion having the wedge shape in section is filled with a material in which light-absorbing particles 49 are added into a transparent substance 46 (hereinafter, referred to as "transparent low-refractive index substance") having a refractive index Nx4 smaller than the refractive index Ny4. The portion formed in the wedge shape is sandwiched by the lens portions 42 and 42 vertically adjacent to each other. Hereinafter, the portion filled with the material 46 to which the light-absorbing particles 49 are added is referred to as "wedge-shaped portion 44". The wedge-shaped portion 44 has the leading edge on the observer side, and the wedge-shaped portion 44 has a bottom surface 47 on the screen image source side and a top portion 48 on the observer side.

In the fourth embodiment, a ratio of the refractive index Ny4 of the lens portion 42 to the refractive index Nx4 of the transparent low-refractive index substance is set in a predetermined range in order to obtain the optical characteristics of the view angle control sheet S4. An angle formed by the slope where the wedge-shaped portion 44 and the lens portion 42 are in contact with each other and the normal line V (line parallel to the normal-incidence light beam relative to the view angle control sheet S4) of the outgoing light beam plane is formed at a predetermined angle $\theta_4$.

The lens portion 42 is usually made of the material such as epoxy acrylate having the ionizing radiation curing property. A material such as urethane acrylate having the ionizing radiation curing property is usually used as the transparent low-refractive index substance. Commercially available color resin fine particles can be used as the light-absorbing particles 49. The screen image source side base sheet 41 and the observer-side base sheet 43 are made of a material whose refractive index is substantially similar to that of the lens portion 42. Similarly to the view angle control sheet S1 according to the first embodiment, in the fourth embodiment, the outside surface of the observer-side base sheet 43 has the function of at least one of AR, AS, AG and a touch sensor on the observer side.

The optical path of the light beam incident to the lens portion 42 of the view angle control sheet S4 will briefly be described with reference to FIG. 4. The optical paths of light beams L41 to L43 and L44 are schematically shown in FIG. 4. In FIG. 4, the normal light beam L41 incident near the center portion of the lens portion 42 from the screen image light source side goes straight in and passes through the view angle control sheet S4 to reach the observer. The light beam L42 obliquely incident near the end portion of the lens portion 42 from the screen image light source side is totally reflected from the slope due to the refractive index difference between the lens portion 42 and the transparent low-refractive index substance, and the light beam L42 is emitted onto the observer side as the normal light beam. The light beam L43 incident near the end portion of the lens portion 42 from the screen image light source side with the larger angle is totally reflected from the slope, and the light beam L43 is output onto the observer side with the small angle close to the normal light beam while output toward the direction opposite from the direction of the incident light beam in relation to the normal line. The light beam L44, which impinges on the bottom surface 47 of the wedge-shaped portion 44, is incident to the inside of the wedge-shaped portion 44. Then, the light beam L44 is absorbed by the light-absorbing particles 49 and the light beam L44 never reaches the observer side. The outside light beam L45 incident to the slope from the observer side with the angle smaller than a predetermined angle is not totally reflected irrespective of the refractive index difference between the lens portion 42 and the transparent low-refractive index substance, but the outside light beam L45 is incident to the inside of the wedge-shaped portion 44. The outside light beam L45 is absorbed by the light-absorbing particles 49 of the wedge-shaped portion 44. Accordingly, the image contrast is improved in the visual field from the observer side. Thus, the view angle can be controlled in the cross-sectional direction and the decrease in brightness can be suppressed, so that the high-contrast view angle control sheet. S4 can be obtained.

FIFTH EMBODIMENT

Figure 5:
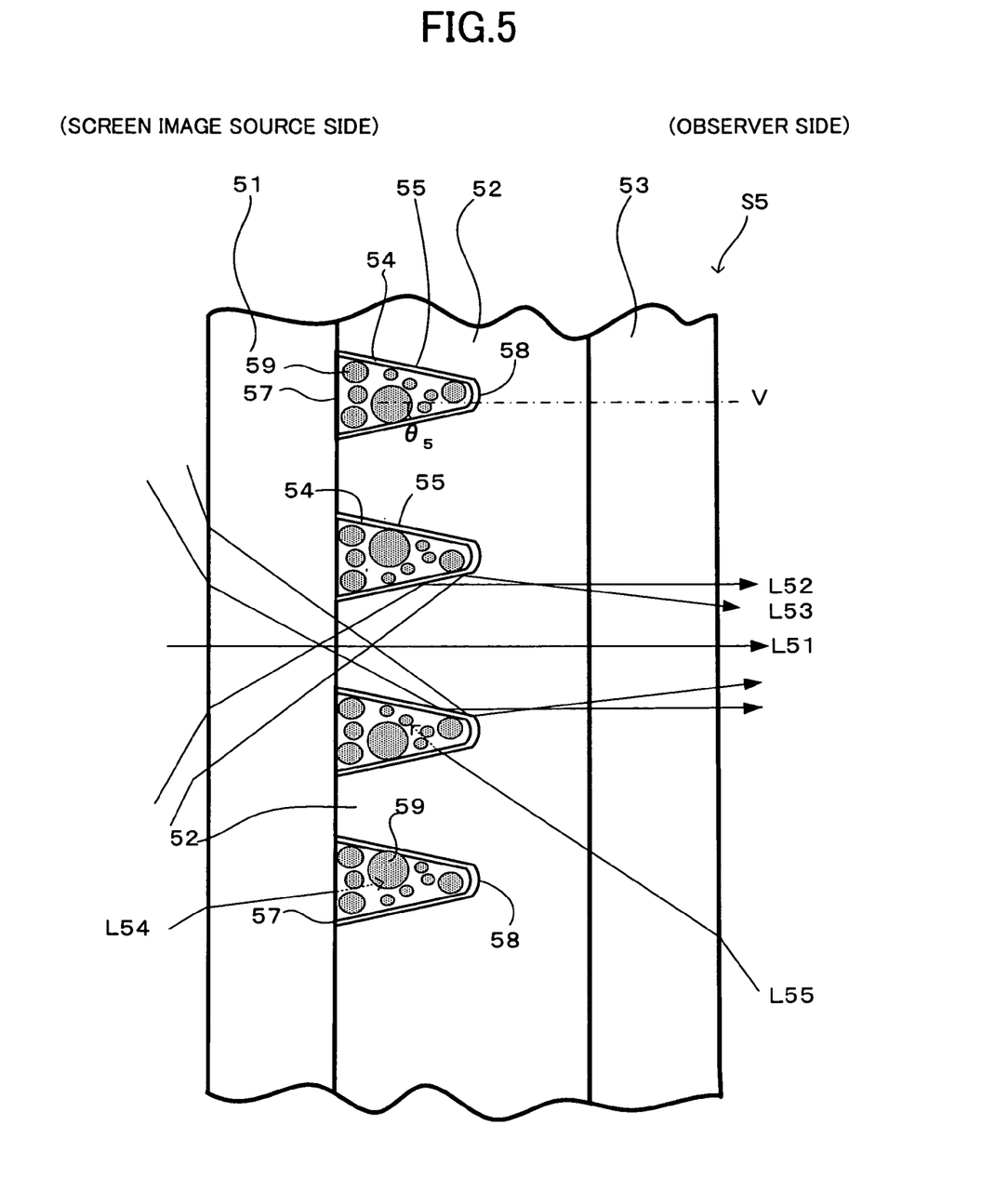
FIG. 5 is a view showing a cross section in one direction of a view angle control sheet according to a fifth embodiment.

FIG. 5 shows a view angle control sheet S5 according to a fifth embodiment of the invention. The view angle control sheet S5 is also formed by laminating a screen image source side base sheet 51, a lens portion 52, and an observer-side base sheet 53 in the order from the screen image source side to the observer side. The lens portion 52 is made of a substance having a high refractive index Ny5. A portion sandwiched by the lens portions 52 and 52 vertically adjacent to each other forms a wedge-shaped portion 54, the slopes and a top portion 58 of the wedge-shaped portion 54 are formed by a layer 55 (hereinafter, referred to as "transparent low-refractive index layer 55"). The transparent low-refractive index layer 55 has a refractive index Nx5 smaller than the refractive index Ny5, and the transparent low-refractive index layer 55 is made of a transparent substance. The inside of the wedge-shaped portion 54 is filled with a material in which light-absorbing particles 59 are added into a substance having a refractive index higher than the refractive index Nx5.

A ratio of the refractive index Ny5 of the lens portion 52 to the refractive index Nx5 of the transparent low-refractive index layer 55 is set in the predetermined range in order to obtain the optical characteristics of the view angle control sheet S5. An angle formed by the slope where the transparent low-refractive index layer 55 and the lens portion 52 are in contact with each other and the normal line V (line parallel to the normal-incidence light beam relative to the view angle control sheet S5) of the outgoing light beam plane is formed at a predetermined angle $\theta_5$.

The lens portion 52 is usually made of the material such as epoxy acrylate having the ionizing radiation curing property. The transparent low-refractive index layer 55 is made of a material such as silica having a refractive index lower than that of the transparent resin. The commercially available color resin fine particles can be used as the light-absorbing particles 59. The screen image source side base sheet 51 and the observer-side base sheet 53 are made of the material whose refractive index is substantially similar to that of the lens portion 52. Similarly to the view angle control sheet S1 according to the first embodiment, in the fifth embodiment, the outside surface of the observer-side base sheet 53 has the function of at least one of AR, AS, AG and a touch sensor on the observer side.

The optical path of the light beam incident to the lens portion 52 of the view angle control sheet S5 will briefly be described with reference to FIG. 5. The optical paths of the light beams L51 to L54 are also schematically shown in FIG. 5. In FIG. 5, the normal light beam L51 incident near the center portion of the lens portion 52 from the screen image light source side goes straight in and passes through the view angle control sheet S5 to reach the observer.

The light beam L52 obliquely incident near the end portion of the lens portion 52 from the screen image light source side is totally reflected from the slope due to the refractive index difference between the lens portion 52 and the transparent low-refractive index layer 54, and the light beam L52 is output onto the observer side as the normal light beam. The light beam L53 incident near the end portion of the lens portion 52 from the screen image light source side with the larger angle is totally reflected from the slope, and the light beam L53 is emitted onto the observer side with the small angle close to the normal light beam while emitted toward the direction opposite from the direction of the incident light beam in relation to the normal line. The light beam L54 incident to the wedge-shaped portion 54 from screen image light source side is absorbed by the light-absorbing particles 59 and the light beam L54 is never emitted to the observer side as the reflection light beam. The outside light beam L55 incident to the hypotenuse from the observer side with the angle smaller than a predetermined angle is not totally reflected irrespective of the refractive index difference between the lens portion 52 and the transparent low-refractive index layer 55, but the outside light beam L55 is incident to the inside of the wedge-shaped portion 54. The outside light beam L55 is absorbed by the light-absorbing particles 59 of the wedge-shaped portion 54. Accordingly, the image contrast is improved in the visual field from the observer side. Thus, the view angle can be controlled in the cross-sectional direction and the decrease in brightness can be suppressed, so that the high-contrast view angle control sheet S5 can be obtained.

In the light beam absorption particles 49 and 59 in the view angle control sheets S4 and S5 according to the fourth and fifth embodiments, an average particle size is preferably 1 μm or larger. When the sizes of the light beam absorption particles 49 and 59 are excessively small, only the insides of the wedge-shaped portion 44 and 54 are hardly filled with the light beam absorption particles 49 and 59 during the production.

The light-absorbing particles 49 and 59 in the view angle control sheets S4 and S5 according to the fourth and fifth embodiments preferably have 10 to 50 volume % of the whole volume of the wedge-shaped portion 44 or 55. Maintaining the above volume ratio enables simple production conditions to be given while the light-absorbing effect is sufficiently kept.

Figure 6:
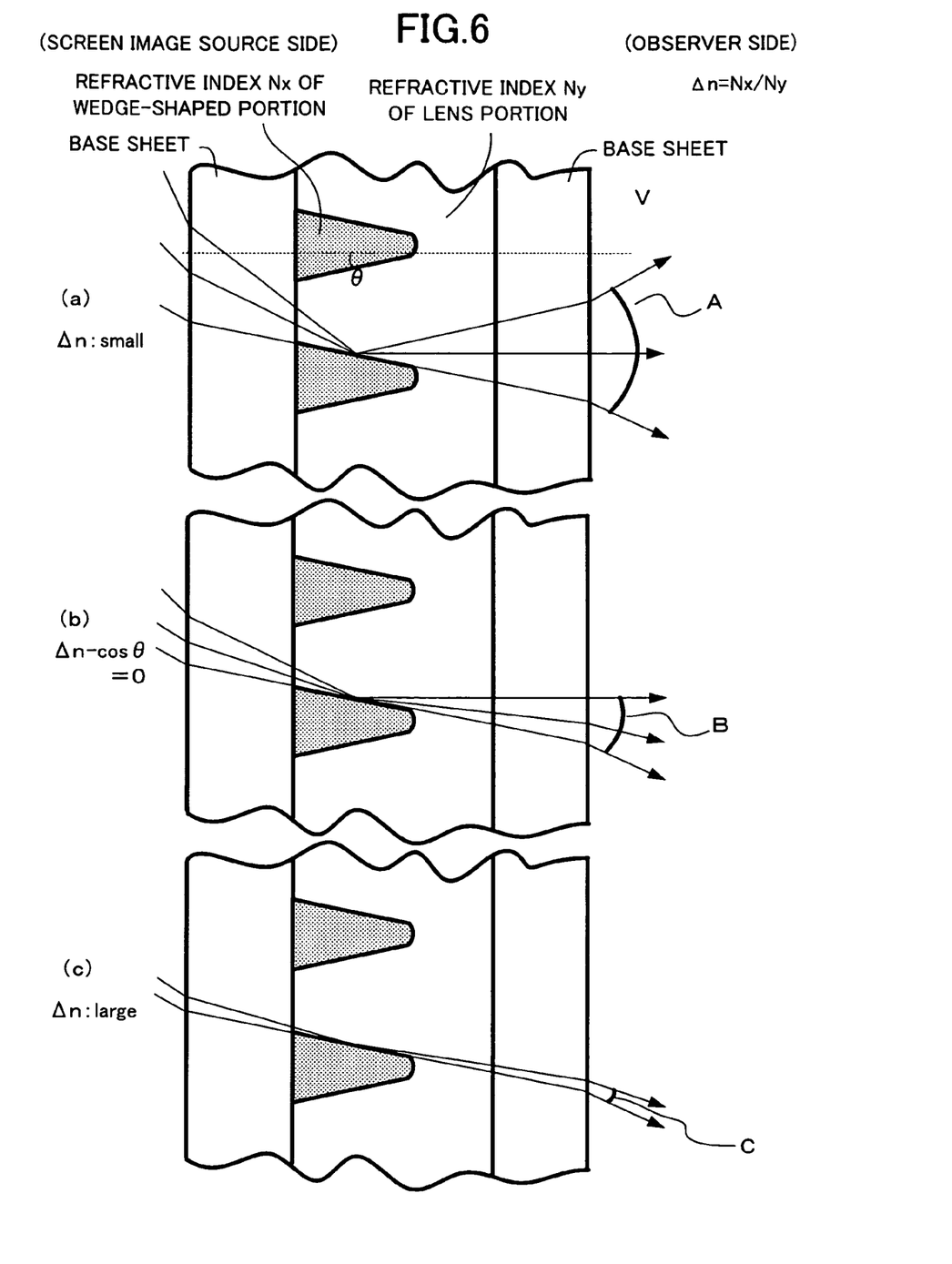
FIG. 6 is a schematic sectional view illustrating a state in which a light beam reflected from a slope of a wedge-shaped portion of the view angle control sheet reaches an observer side.

FIG. 6 is a schematic sectional view illustrating a state in which the light beam reflected from the slope of the wedge-shaped portion of the view angle control sheet reaches the observer side. For the purpose of comparison, three cases (FIGS. 6A to 6C) are shown in FIG. 6.

Assuming that θ is an angle formed by the slope portion of the wedge-shaped portion and a normal line of the light beam outgoing plane and Δn is a ratio (Nx/Ny) of a refractive index Nx of a material constituting at least the slope portion of the wedge-shaped portion to a refractive index Ny of the lens portion, FIG. 6A shows the case where Δn is a small value, and the total reflection occurs in the range of A shown in FIG. 6A. FIG. 6B shows the case of Δn −cos θ=0, and FIG. 6B shows a boundary where the totally reflected light reaches the front face. The total reflection occurs in the range of B in FIG. 6B. FIG. 6C shows the case where Δn is a large value, and the reflected light does not reach the front face. The total reflection occurs in the range of C shown in FIG. 6C. In the invention, after the practical characteristics are added, the preferable range satisfies the following relationship:

$$-0.01 < \Delta n - \cos \theta < 0.002$$

When the value of (Δn−cos θ) is not more than −0.01, portion of the totally reflected light beam becomes dominant, and the totally reflected light is observed in the wide range. Therefore, particularly in the case where the totally reflected light is observed from the oblique direction, a distance between the ghost image and the real image is increased, which causes the ghost image to become highly conspicuous. Therefore, the screen image quality is degraded. On the other hand, when the value of (Δn−cos θ) is 0.002 or higher, the quantity of totally reflected light beam becomes small, and the effective screen image light hardly reaches the observer. Therefore, the effect of brightness increase is not sufficiently obtained.

The invention can be applied to both the case in which the sectional shape of the wedge-shaped portion is substantially an isosceles triangle and the case in which the top portion of the wedge-shaped portion has the width.

Figure 7:
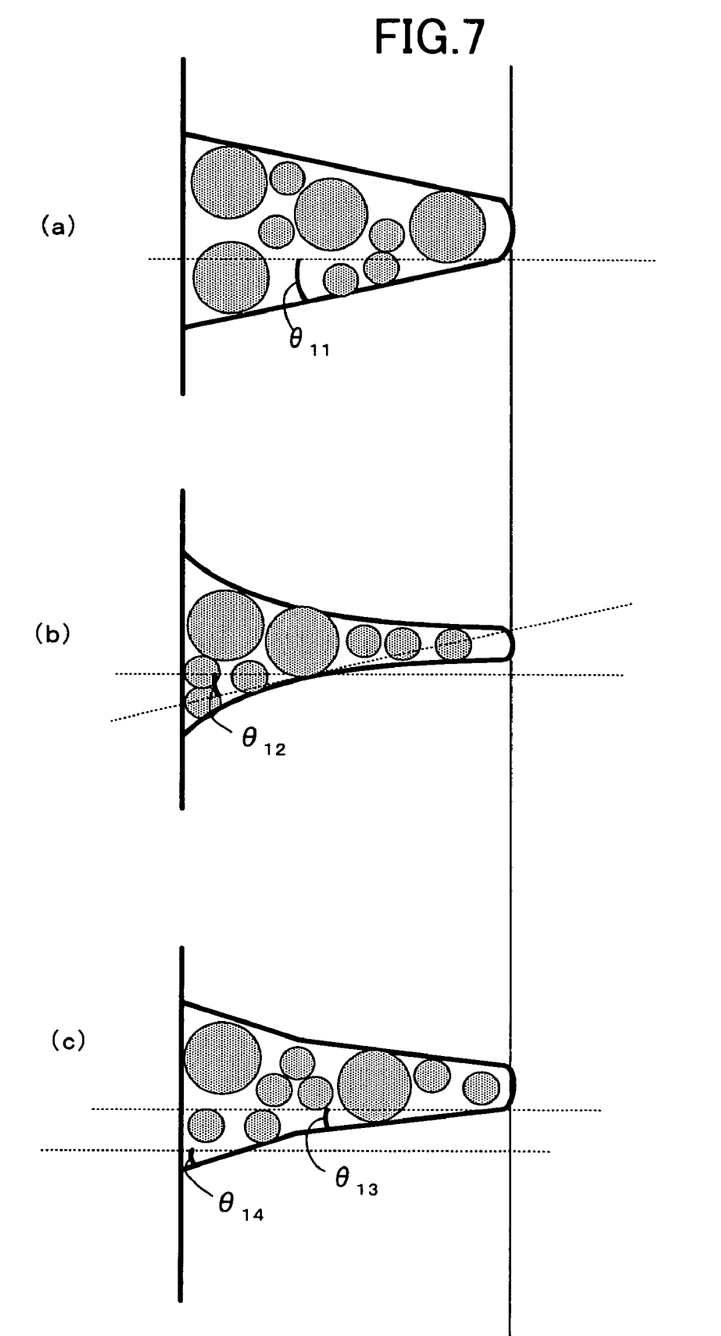
FIG. 7 is a view showing various aspects of a wedge-shaped portion.

FIG. 7 is a view showing various shape modes of the wedge-shaped portion. The wedge-shaped portion has the shape formed between the two adjacent unit lenses.

FIG. 7A shows the case where the slope is formed by a straight line. In this case, the angle $\theta_{11}$ formed by the slope and the normal line of the light beam outgoing plane is kept constant at any point on the slope.

FIG. 7B shows the case where the slope is formed by a smoothly curved line. FIG. 7C shows the case where the slope is formed by two straight lines. In these cases, the angles $\theta_{12}$, $\theta_{13}$ or $\theta_{14}$ formed by the slopes and the normal lines of the light beam outgoing planes depend on the position on the slope. In the invention, when the angle formed by the slope and the normal line of the light beam outgoing plane is not kept constant like the cases shown in FIG. 7B and FIG. 7C, at least 90% length of the slope satisfies the above-described condition, which allows the effect of the invention to be obtained.

Figure 8:
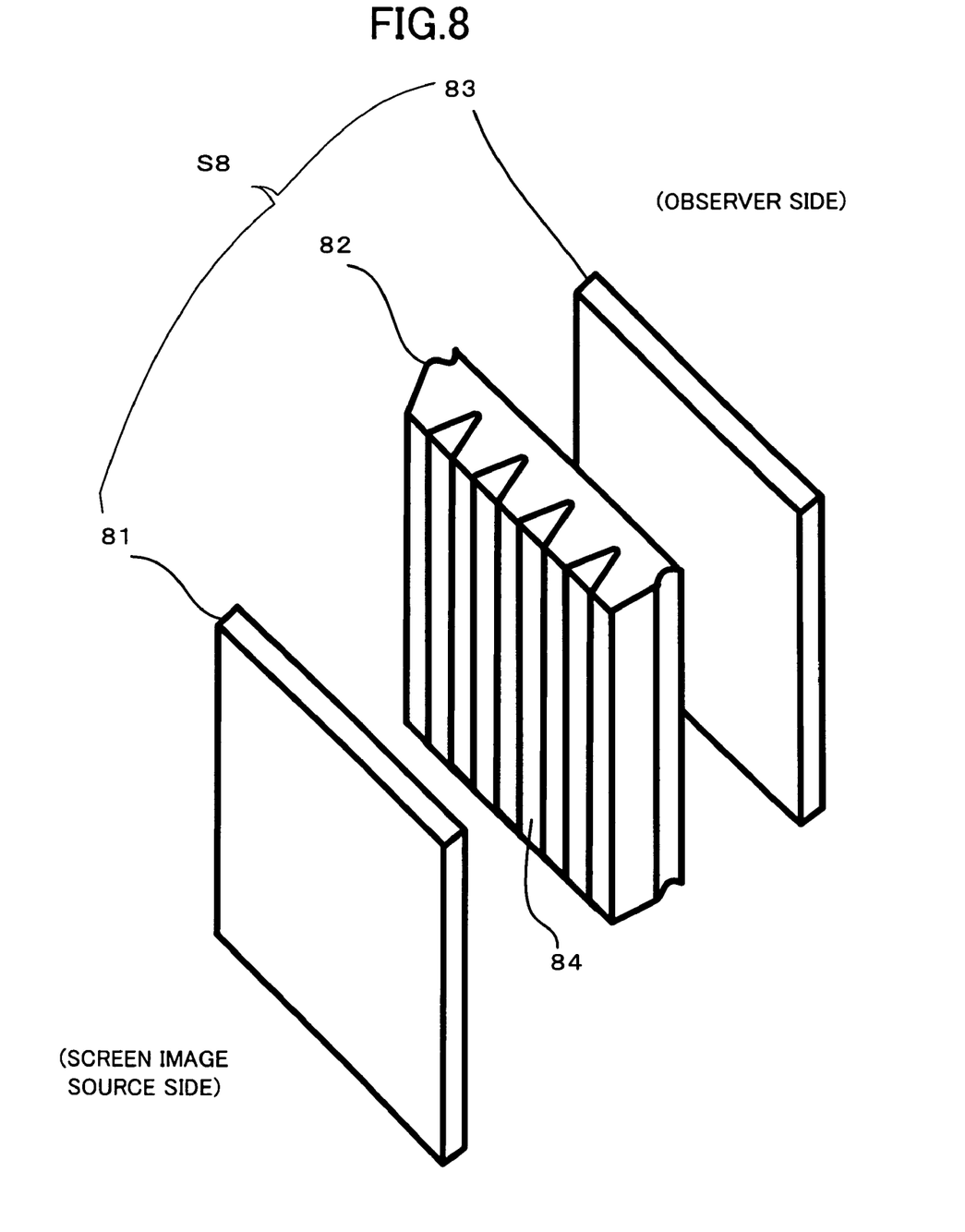
FIG. 8 is a view showing another example of the configuration of the view angle control sheet.

FIG. 8 is a view showing an example of the configuration of the view angle control sheet according to the invention. A view angle control sheet S8 shown in FIG. 8 includes a unit lens 82 whose horizontally sectional shape is constant in the vertical direction.

A base sheet 81 is arranged on the screen image source side and a base sheet 83 is arranged on the observer side. In FIG. 8, although the three components are shown while separated from one another for the purpose of understanding, actually the components are laminated to one another.

Figure 9:
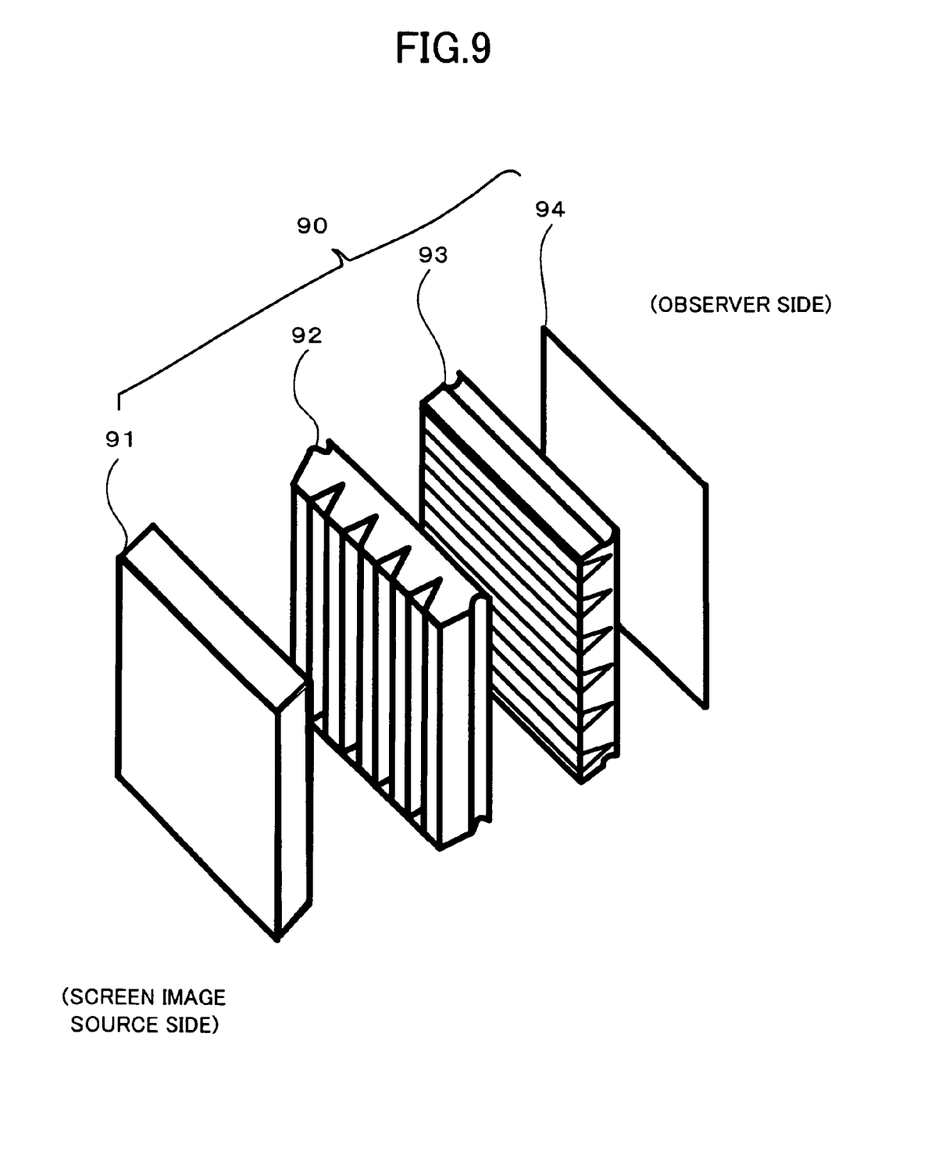
FIG. 9 is a view showing an example of the configuration of a display device provided with the view angle control sheet of the invention.

FIG. 9 shows a configuration of a display device 90 provided with the view angle control sheet according to the invention. In FIG. 9, the screen image source side is set in a front lower-left direction and the observer side is set in a back upper-right direction. The display device 90 of the invention includes a liquid crystal display panel 91, a view angle control sheet 92, a view angle control sheet 93, and a functional sheet 94. The liquid crystal display panel 91, the view angle control sheet 92, the view angle control sheet 93, and the functional sheet 94 are laminated in the order from the screen image source side. The lens portion is vertically arranged in the view angle control sheet 92, and the lens portion is horizontally arranged in the view angle control sheet 93. The functional sheet 94 has at least one of the functions AR, AS, AG and a touch sensor. The base sheets of the view angle control sheet 92 and view angle control sheet 93 are neglected in FIG. 9. The arrangement between the view angle control sheet 92 and the view angle control sheet 93 may be replaced. In FIG. 9, although the components are shown while separated from one another for the purpose of understanding, actually the components are in contact with one another or the components are bonded to one another.

EXAMPLES

Example 1

The view angle control sheet is produced based on the following requirements. The view angle control sheet has the wedge-shaped portion whose sectional shape is formed in the wedge shape as shown in FIG. 4. Further, in the view angle control sheet, the black stripe BS (not shown) is provided in the bottom surface located on the screen image light source side of the wedge-shaped portion. A numerical aperture indicates an area ratio of the lens portion in which an area of wedge-shaped portion bottom surface portion of the wedge-shaped portion is excluded in the view angle control sheet, and a tapered angle indicates the angle (θ) formed by slope portion of the wedge shape and the normal line of the light beam outgoing plane.

Numerical aperture: 70%
Inter-lens pitch: 0.05 mm
Refractive index of lens portion material (resin): 1.56
Refractive index of wedge-shaped portion material: 1.55
Width of top portion of wedge-shaped portion: 3 μm
Tapered angle: 6°
Diameter of black light-absorbing particles: 5 μm
Density of black light-absorbing particles: 25 volume %

Example 2

The view angle control sheet is produced in the same conditions as Example 1 except that the refractive index of the wedge-shaped portion material is set at 1.54.

Example 3

The view angle control sheet is produced in the same conditions as Example 1 except that the refractive index of the wedge-shaped portion material is set at 1.554.

Comparative Example 1

The view angle control sheet is produced in the same conditions as Example 1 except that the refractive index of the wedge-shaped portion material is set at 1.53.

Comparative Example 2

The view angle control sheet is produced in the same conditions as Example 1 except that the refractive index of the wedge-shaped portion material is set at 1.558.

The view angle control sheets produced in Examples 1 to 3 and Comparative examples 1 and 2 are sequentially places in front of the liquid crystal display device, and the view angle control sheets are compared to one another by visual acceptable and defective determination in the brightness of the screen image light and the presence or absence of the ghost. Table 1 shows the result and overall evaluation. The lower items of Table 1 also show numerical values of Δn=Nx/Ny and (Δn−cos θ).

TABLE 1

| | Example 1 | Example 2 | Example 3 | Comparative Example 1 | Comparative Example 2 |
|---|---|---|---|---|---|
| Refractive index of lens portion | 1.56 | 1.56 | 1.56 | 1.56 | 1.56 |
| Refractive index of wedge-shaped portion | 1.55 | 1.54 | 1.554 | 1.53 | 1.558 |
| Brightness | acceptable | acceptable | acceptable | acceptable | defective |
| Ghost | absence | absence | absence | presence | absence |
| Overall evaluation | acceptable | acceptable | acceptable | defective | defective |
| Δn = Nx/Ny | 0.9936 | 0.9872 | 0.9962 | 0.9808 | 0.9987 |
| Δn − cos θ | −0.0009 | −0.0073 | 0.0017 | −0.0137 | 0.0042 |

As shown in Table 1, the screen image light incident to the effective portion is totally reflected and converged in the view angle control sheets of Examples 1 to 3. Therefore, the diffuse light from the screen image source is effectively utilized to suppress the decrease in screen brightness, the contrast is high, the ghost is not generated, and the favorable characteristics are obtained. The view angle of 15° is obtained. On the contrary, the view angle control sheet of Comparative Example 1 is not suitable because the ghost is generated. The view angle control sheet of Comparative Example 2 is not suitable because the sufficient brightness is not obtained.

Thus, the invention is described with reference to the embodiments which are considered to be currently most practical and preferable. However, the invention is not limited to the embodiments disclosed in the description, but the various modifications could appropriately be made without departing from the summary or thought of the invention which can be read from claims of the invention and the whole of the description.

Industrial Applicability

As described above, the invention can provided the view angle control sheet having the wide view angle, in which the diffuse light from the screen image source is effectively utilized to suppress the decrease in screen brightness while the decrease in image contrast caused by the outside light beam is suppressed to prevent the generation of the ghost and thereby the contrast is improved. Therefore, the invention has the extremely high industrial applicability.

DESCRIPTION OF THE REFERENCE NUMERALS AND SIGNS

S1, S2, S3, S4, S5, and S8 view angle control sheet
11, 21, 31, 41, 51, and 81 screen image source side base sheet
12, 22, 32, 42, 52, and 82 lens portion
13, 23, 33, 43, 53, and 83 observer-side base sheet
14, 24, 34, 44, 54, and 84 wedge-shaped portion
35 and 55 transparent low-refractive index layer
17, 27, 37, 47, and 57 bottom surface
18, 28, 38, 48, and 58 top portion
46 material to which light-absorbing particles are added
49 and 59 light-absorbing particles
90 display device
91 liquid crystal display panel
92 and 93 view angle control sheet
94 functional sheet
L11, L12, L13, L21, L22, L23, L31, L32, L33, L41, L42, L43, L51, L52, and L53 light beam
L14, L24, L34, L44, and L54 light incident to bottom surface
L15, L25, L35, L45, and L55 outside light beam

The invention claimed is:

1. A view angle control sheet comprising lens portions having trapezoidal shapes in section are arranged at predetermined intervals, a wedge-shaped portion between said lens portions adjacent to each other is filled with the same material as said lens portion or with a material different from said lens portion, said wedge-shaped portion has a bottom surface on a screen image source side while having a leading end on an observer side, and the following relationships hold:

$$Nx \leq Ny$$

$$-0.01 < \Delta n - \cos\theta < 0.002$$

where Nx is a refractive index of a material constituting at least a slope portion of the wedge-shaped portion, Ny is a refractive index of a material constituting said lens portion, θ is an angle formed by the slope portion of the wedge-shaped portion and a normal line of a light beam outgoing plane, and Δn is a ratio (Nx/Ny) of said refractive index Nx to said refractive index Ny;

a sectional shape of said wedge-shape portion has a wide bottom surface on the screen image source side; and a sectional shape of said lens portion has a wide lower base on the observer side, and the sectional shape of said lens has a narrow upper base on the screen image side.

2. A view angle control sheet according to claim 1, wherein, assuming that θ is an angle formed by the slope portion of said wedge-shaped portion and a normal line of a light beam outgoing plane, θ ranges from 3 degrees to 15 degrees.

3. A view angle control sheet according to claim 2, wherein a sectional shape of said wedge-shaped portion is substantially an isosceles triangle.

4. A view angle control sheet according to claim 3, wherein said wedge-shaped portion has a light-absorbing effect.

5. A view angle control sheet according to claim 4, wherein said wedge-shaped portion is filled with a material to which light-absorbing particles are added.

6. A view angle control sheet according to claim 5, wherein said wedge-shaped portion is formed in a wedge shape having a wide bottom surface on the screen image source side, and an average particle size of said light beam absorption particles is 1 μm or larger.

7. A view angle control sheet according to claim 2, wherein said wedge-shaped portion has a light-absorbing effect.

8. A view angle control sheet according to claim 7, wherein said wedge-shaped portion is filled with a material to which light-absorbing particles are added.

9. A view angle control sheet according to claim 8, wherein said wedge-shaped portion is formed in a wedge shape having a wide bottom surface on the screen image source side, and an average particle size of said light beam absorption particles is 1 μm or larger.

10. A view angle control sheet according to claim 1, wherein a sectional shape of said wedge-shaped portion is substantially an isosceles triangle.

11. A view angle control sheet according to claim 10, wherein said wedge-shaped portion has a light-absorbing effect.

12. A view angle control sheet according to claim 11, wherein said wedge-shaped portion is filled with a material to which light-absorbing particles are added.

13. A view angle control sheet according to claim 12, wherein said wedge-shaped portion is formed in a wedge shape having a wide bottom surface on the screen image source side, and an average particle size of said light beam absorption particles is 1 μm or larger.

14. A view angle control sheet according to claim 1, wherein said slope portion has a curved sectional shape and/or a polygonal-line sectional shape such that the screen image source side differs from the observer side in an angle formed by said slope portion and an observer-side surface.

15. A view angle control sheet according to claim 14, wherein said wedge-shaped portion has a light-absorbing effect.

16. A view angle control sheet according to claim 15, wherein said wedge-shaped portion is filled with a material to which light-absorbing particles are added.

17. A view angle control sheet according to claim 16, wherein said wedge-shaped portion is formed in a wedge shape having a wide bottom surface on the screen image source side, and an average particle size of said light beam absorption particles is 1 μm or larger.

18. A view angle control sheet according to claim 1, wherein said wedge-shaped portion has a light-absorbing effect.

19. A view angle control sheet according to claim 18, wherein said wedge-shaped portion is filled with a material to which light-absorbing particles are added.

20. A view angle control sheet according to claim 19, wherein said wedge-shaped portion is formed in a wedge shape having a wide bottom surface on the screen image source side, and an average particle size of said light beam absorption particles is 1 μm or larger.

21. A view angle control sheet according to claim 20, wherein an additional amount of light-absorbing particles ranges from 10 to 50 volume % in the material with which said wedge-shape portion is filled.

22. A view angle control sheet according to claim 19, wherein an additional amount of light-absorbing particles ranges from 10 to 50 volume % in the material with which said wedge-shape portion is filled.

23. A display device comprising one view angle control sheet according to claim 1 laminated on the observer side of a screen image source.

24. A display device comprising two view angle control sheets according to claim 1 laminated on the observer side of a screen image source, and the control sheets are disposed substantially orthogonal to each other.

25. A view angle control sheet according to claim 1, wherein at least one function of any one of anti-reflection, anti-static, anti-glare and a touch sensor are imparted to at least one surface side.

26. A display device wherein a view angle control sheet according to claim 1 is bonded.

* * * * *

UNITED STATES PATENT AND TRADEMARK OFFICE
CERTIFICATE OF CORRECTION

PATENT NO.      : 7,599,117 B2
APPLICATION NO. : 10/587551
DATED           : October 6, 2009
INVENTOR(S)     : Masahiro Goto It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 525 days.

Signed and Sealed this

Twenty-eighth Day of September, 2010

David J. Kappos
*Director of the United States Patent and Trademark Office*